Figure 6:
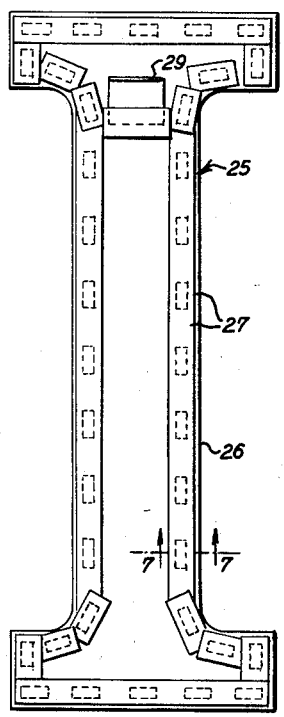

May 10, 1960 C. W. WOODRING ET AL 2,935,936
STENCIL WITH MAGNETIC HOLDING MEANS
Filed July 17, 1956 3 Sheets-Sheet 1
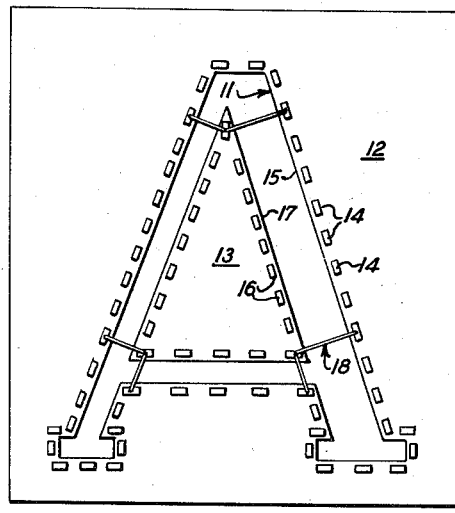
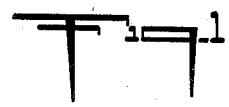
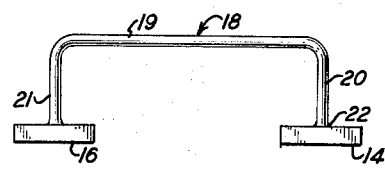
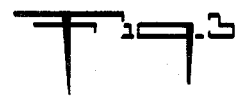
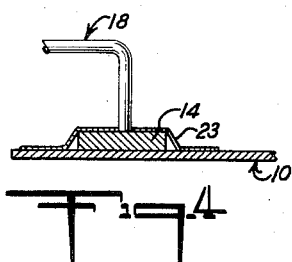
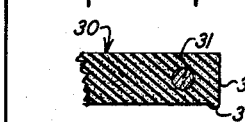
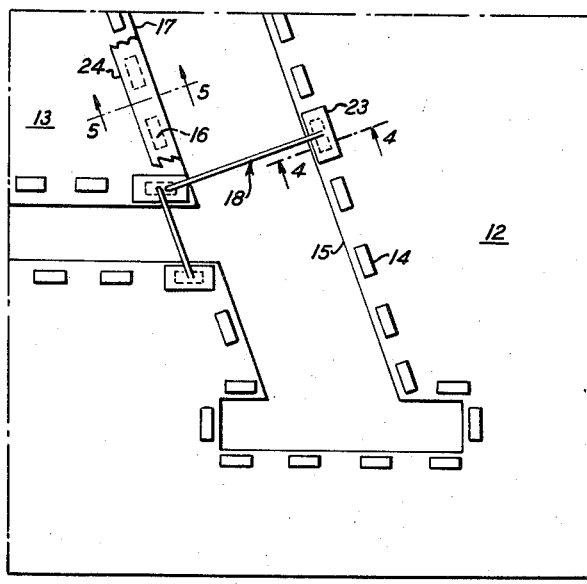
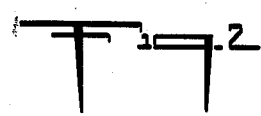
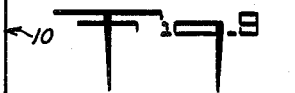
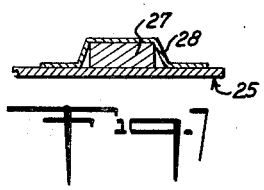
INVENTORS
C. W. WOODRING
JOSEPH E. KNEPPER
BY
Herbert J. Jacobi
ATTORNEY May 10, 1960 C. W. WOODRING ET AL 2,935,936
STENCIL WITH MAGNETIC HOLDING MEANS
Filed July 17, 1956 3 Sheets-Sheet 2

INVENTORS
C. W. WOODRING
JOSEPH E. KNEPPER

BY *Herbert J. Jacobi*

ATTORNEY

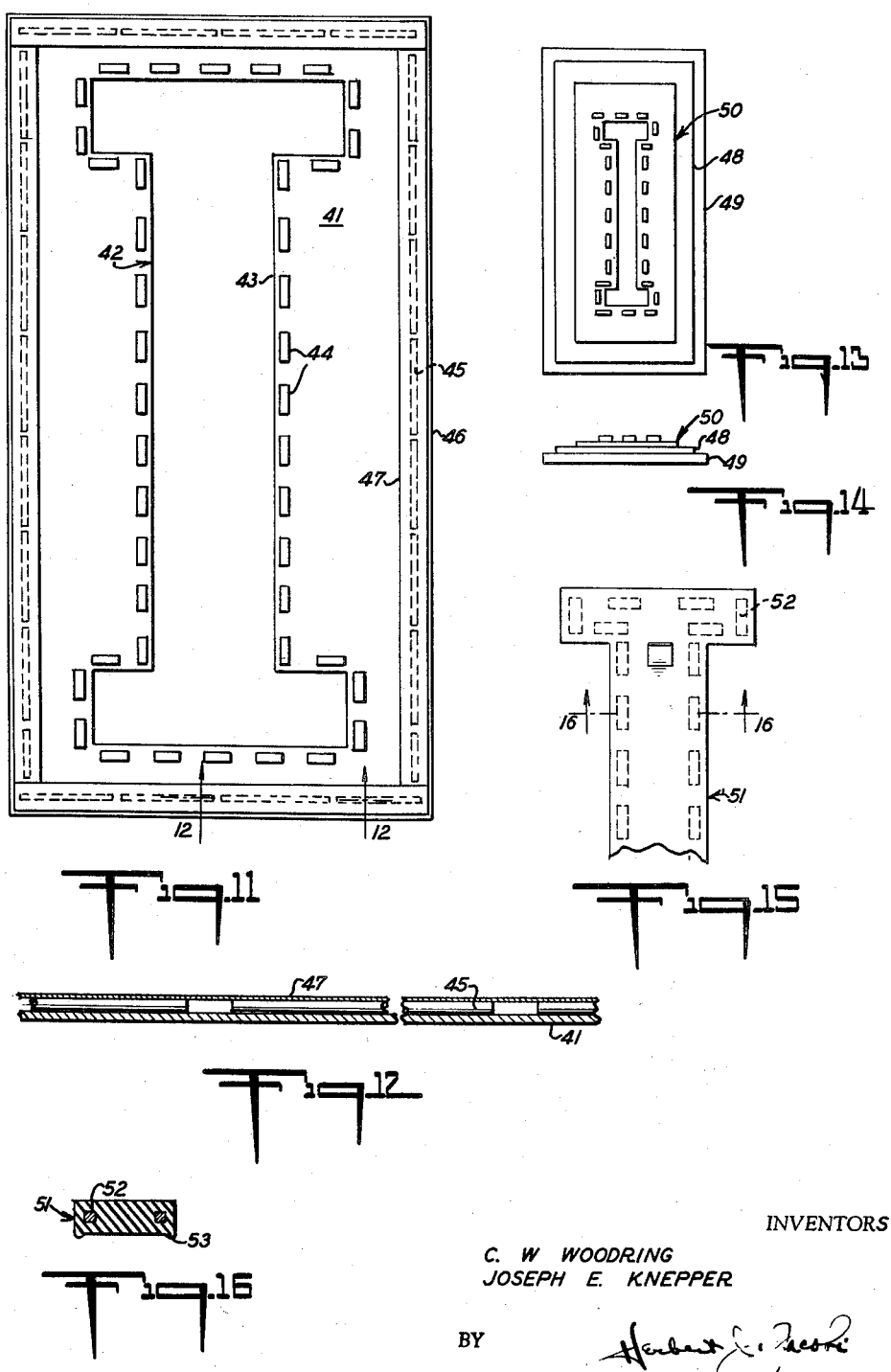

United States Patent Office 2,935,936
Patented May 10, 1960

2,935,936

STENCIL WITH MAGNETIC HOLDING MEANS

Clarence W. Woodring and Joseph E. Knepper, Altoona, Pa.

Application July 17, 1956, Serial No. 598,416

5 Claims. (Cl. 101—128.1)

This invention relates to the art of decoration and more particularly to a stencil for use in applying indicia, such as letters, numbers, monograms or the like to any surface of a magnetic body and in which such indicia presents an unbroken outline with clean, sharp edges and in which the stencil may be reused many times without cleaning or damage thereto.

Heretofore, many different types of stencils have been employed for facilitating the applying of a coating composition to the surface of an object to be stenciled, but in general, these prior stencils have been held in place by hand or have been secured by an adhesive strip, by tacks or other suitable fastening means and furthermore, it has proved exceedingly difficult to maintain the edges of the indicia cutouts in intimate contact with the surface to be coated with the result that where the coating composition has been sprayed from spray guns utilizing pressures of the order from ten to eighty pounds per square inch, it has been found that the coating composition frequently penetrates beneath the edges of the stencil thereby preventing the formation of clear, sharp edges on the indicia. Also in the case where letters having unsupported sections were utilized, it has, heretofore, been necessary to support these sections of the stencil by connecting portions which served to mask the surface to be coated therebeneath, with the result that these masked portions would not receive the coating composition or would have to be filled in after removal of the stencil. Furthermore, in the stencilling of the surfaces of magnetic objects, such as railway cars, ships, automobiles and the like, it has been found difficult to securely fasten the stencil in place and particularly to obtain an intimate contact between the edges of the cutouts on the stencil and the surface to be coated.

It is accordingly an object of the invention to provide a stencil which may be conveniently and economically manufactured from readily available material and which may be quickly applied to and removed from a surface of a magnetic body to which the stencil is to be applied and in which one or more letters providing the desired indicia may be provided by cutouts in the material forming the stencil.

A further object of the invention is the provision of a stencil for application to the surface of a magnetic body and in which bar magnets are incorporated in the stencil adjacent the edges of the cutouts providing the desired indicia, such magnets serving to hold the edges of the cutouts in intimate engagement with the surface to be stenciled.

A still further object of the invention is the provision of a stencil for application to the surface of a body of magnetic material and in which the desired indicia is provided by cutouts in the panel forming the stencils, any unsupported sections of the indicia provided by the cutouts being supported by bridging members spaced above the surface of the panel forming the stencil a sufficient distance to permit application of the coating composition beneath such edges thereby providing an unbroken application of the coating composition.

Another object of the invention is the provision of a stencil for application to the surface of a magnetic body in which bar magnets are applied to a panel of flexible material providing a mask, these magnets being secured adjacent the edges of cutouts in the panel providing the desired indicia and in which a fabric tape is applied to the surface of the panel between the magnets and the panel in order to prevent tearing of the panel material adjacent the edges of the cutouts.

A further object of the invention is the provision of a stencil for application to the surface of the body of magnetic material in which such stencil may comprise a blank of flexible material forming a mask and having an edge outline providing the desired indicia, there being a plurality of bar magnets secured to the blank in end to end relationship adjacent the edges thereof to hold the blank and such edges in intimate contact with the surface to be stenciled.

A still further object of the invention is the provision of a stencil for application to the surface of a body of magnetic material in which such stencil is molded from rubber, plastic or other suitable material, there being a continuous magnet of granular magnetic material molded into the body of the stencil adjacent the edges thereof.

Another object of the invention is the provision of a stencil for application to the surface of a body of magnetic material, such stencil comprising a molded body of rubber, plastic or other suitable material and in which bar magnets are molded into the body in end to end relationship adjacent the edges thereof.

A further object of the invention is the provision of a stencil for application to the surface of a body of magnetic material in which the stencil comprises a body of molded rubber, plastic or other suitable material and having cutouts therein to provide the desired indicia, there being magnets molded within the material of the body adjacent the edges of the cutouts to hold such edges in intimate contact with the surface to be stenciled.

A still further object of the invention is the provision of a stencil for application to the surface of a body of magnetic material in which such stencil comprises a panel of flexible material having cutouts therein providing the desired indicia and with magnets secured to the panel adjacent the edges of the cutouts to hold such edges in intimate contact at the surface to be stenciled, there being a frame secured to the panel adjacent the edges thereof to reinforce and facilitate manipulation of the same.

A further object of the invention is the provision of a stencil for application to the surface of a body of magnetic material, the stencil being formed of a panel of flexible material, there being cutouts in such panel providing the desired indicia and magnets secured to the panel adjacent the edges of the cutouts to hold such cutouts in intimate contact with the surface to be stenciled, the panel being provided with a frame adjacent the edges thereof comprising a plurality of length of wire secured in spaced end to end relationship to the panel adjacent the edges thereof to provide a semi-flexible frame.

Figure 8:
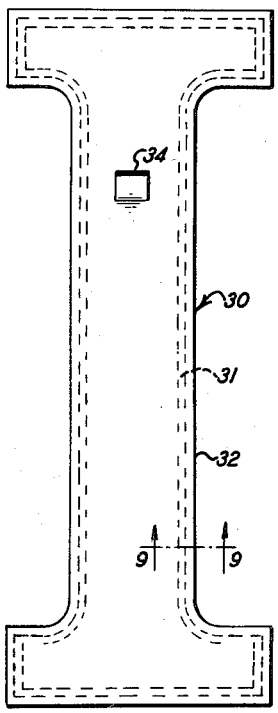
Figure 10:
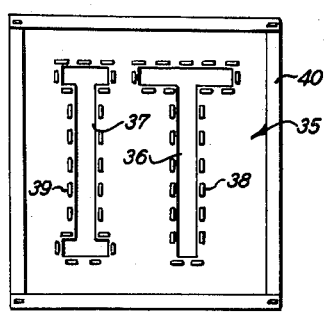
Figure 9:
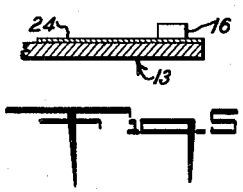

Further objects and advantages of the invention will be apparent from the following description taken in conjunction with the accompanying drawing wherein:

Fig. 1 is a plan view of one form of stencil constructed in accordance with this invention and showing the panel with the magnets applied thereto and the manner of supporting an unsupported portion of the indicia;

Fig. 2 a fragmentary enlarged plan view of the form of the invention shown in Fig. 1 and showing the application of the supporting bridges for supporting an unsupported portion of the indicia, as well as the use of a fabric tape for preventing tearing of the edges of the stencil adjacent the cutouts forming the indicia;

Fig. 3 a side elevational view of two of the magnets utilized in the stencil of this invention, together with the bridge secured to such magnets and utilized for supporting an unsupported portion of the indicia;

Fig. 4 a fragmentary elevational view with parts in section for greater clarity and showing the use of an adhesive tape for securing the magnets in place on the panel forming the stencil;

Fig. 5 a sectional view on the line 5—5 of Fig. 2;

Fig. 6 a plan view of another form of the invention in which the edge outline of the stencil provides the desired indicia and showing a finger engaging tab for facilitating manipulation of the stencil;

Fig. 7 a sectional view on the line 7—7 of Fig. 6;

Fig. 8 a plan view of a still further modified form of the invention in which the body of the stencil is of molded material with the magnetic holding means molded into such material;

Fig. 9 a sectional view on the line 9—9 of Fig. 8;

Fig. 10 a plan view of a further form of the invention showing a plurality of cutouts forming the indicia in the panel, together with a reinforcing frame secured to the panel adjacent the edges thereof;

Fig. 11 a plan view of a still further modified form of the invention in which the reinforcing frame for the panel forming the stencil is provided by a plurality of length of wire secured to the panel adjacent the edges thereof in spaced end to end relationship;

Fig. 12 a sectional view on the line 12—12 of Fig. 11;

Fig. 13 a top plan view of a stencil constructed in accordance with this invention and utilized in conjunction with a non-magnetic material;

Fig. 14 a side elevational view of the structure shown in Fig. 13;

Fig. 15 a fragmentary plan view of a still further form of the invention in which the stencil is molded of moldable material with bar magnets molded into such material; and Fig. 16 a sectional view on the line 16—16 of Fig. 15.

With continued reference to the drawing and particularly Figs. 1 to 5, there is shown a stencil constructed in accordance with this invention and which may well comprise a panel 10 of flexible material, such as fiber board, stencil paper or the like, which material is substantially impervious to the coating composition being employed and in which there is provided a cutout 11 which may be of any form to provide the desired indicia, but which, for purposes of illustration only, shows the letter A. This cutout 11 serves to divide the panel 10 into a main masking portion 12 and a detached masking portion 13 and, of course, if other indicia are selected or if there be a plurality of letters, there may be a plurality of detached masking sections. However, for purposes of illustration, the single letter A with the single detached masking portion 13 is considered sufficient to illustrate the structure and principles of the invention.

Since, most stenciling operations are at present carried out by the use of a spray gun in which pressures of the order of ten to eighty pounds per square inch are utilized for projecting the coating composition onto the surface to be stenciled, it is necessary that the edges of the stencil be held in intimate contact with the surface to be coated, in order to prevent penetration of the coating composition beneath the edges of the stencil thereby fogging the outline and preventing the formation of a clean sharp letter or indicia on the surface to be stenciled. For that purpose and in accordance with the instant invention, there may be applied to the surface of the main masking portion 12 of the panel 10 a plurality of bar magnets 14 arranged in end to end relationship and secured to the surface of the panel 10 in any desired manner, such as by a suitable adhesive and with the magnets 14 located in close proximity to the edge 15 of the cutout 11 of the main masking portion 12 of the panel 10. In a similar manner, bar magnets 16 may be supplied to the detached masking portion 13 in end to end relationship adjacent the edge 17 thereof and, as will be obvious, the magnets 14 and 16 serve to securely hold the edges 15 and 17 of the masking portion 12 and the detached masking portion 13 in intimate contact with the surface to be stenciled.

Since, the detached masking portion 13 forms a part of the indicia, the same must occupy an exact location with respect to the edges 15 of the cutout 11 and for this purpose, a plurality of bridges 18 may be utilized to connect the detached masking portion 13 with the main masking portion 12 thereby supporting the detached masking portion 13 therefrom. As best shown in Figs. 2 and 3, the bridges 18 may well comprise a generally U-shaped wire or rod 19 which may be secured at its ends 20 and 21 to the magnets 14 and 16. The wire 19 may be secured to the magnets 14 and 16 in any suitable manner, such as by silver soldering or brazing, indicated at 22 in Fig. 3. The wire 19 serves to rigidly connect the magnets 14 and 16 and, as shown in Figs. 1 and 2, any desired number of bridges 18 may be utilized to adequately support the detached masking portion 13 from the main masking portion 12 of the body 10. As will be noted, the bridging members 18 are spaced a substantial distance above the surface of the panel 10 thereby providing sufficient space therebeneath to permit convenient spraying of the coating composition beneath the bridges 18 thereby providing an unbroken outline of the indicia formed by the cutouts 11 in the panel 10. Also if desired, the bridges 18 may be utilized as convenient hand-engaging means to facilitate manipulation of the stencil.

As stated above, the magnets 14 and 16 may be applied to the surface of the panel 10 and the detached masking portion 13 by a suitable adhesive or the like and if desired, additional securing means in the form of a fabric tape 23 may be applied over the magnets and secured to the surface of the panel 10 in order to provide a reinforcement and this tape holding means particularly may be employed in connection with the magnets secured to the bridging members 18. This structure is best shown in Fig. 4.

Since, the entire holding force of the magnets 14 and 16 is applied to the material of the panel 10 adjacent the edges 15 and to the material of the detached masking portion 13 adjacent the edges 17 thereof, it is desirable to reinforce such edges, in order to prevent tearing thereof and for this purpose, as shown in Figs. 2 and 5, there may be applied to the surface of the main masking portion 12 of the panel 10 and to the surface of the detached portion 13, a reinforcing fabric tape 24 which may be of any desired width and as shown in Fig. 5, such tape is secured in intimate engagement with the surface of the panel 10 and the detached portion 13 and the magnets 14 and 16 are applied to the surface of the tape. This serves to effectively reinforce the edges of the cutouts and prevent tearing or other damage thereto.

In use, it is only necessary to apply the panel 10 to the surface of a magnetic object to be stenciled, in which case, the magnets 14 and 16 will serve to securely hold the edges 15 and 17 of the main masking portion 12 and the detached masking portion 13 in intimate contact with the surface to be stenciled and thereafter, the coating composition may be applied through the cutouts 11 by means of a spray gun and as mentioned above, in view of the spacing of the bridges 18 above the surface of the panel 10, an unbroken outline of the indicia is obtained. The panel 10 may thereafter be removed simply by lifting the same from the surface to be stenciled and since, there is no penetration of the coating composition beneath the edges of the cutouts, cleaning of the stencil is only necessary at infrequent intervals and such cleaning, of course, may be accomplished by washing or spraying with a suitable solvent. Since, the panel 10 is of flexible material and the magnets 14 and 16 are spaced a small distance apart, the stencil may be applied to curved or irregular surfaces and will closely conform with such surfaces, thereby facilitating application of the stencil thereto.

A modified form of the invention is shown in Figs. 6 and 7 in which the stencil comprises a blank 25 of suitable flexible material, such as stencil paper, fiber board or the like, which blank forms a mask having an edge outline 26 providing the desired indicia. A plurality of bar magnets 27 are secured to the outer surface of the blank 25 in spaced end to end relationship adjacent the edge 26 of the blank 25 and, such magnets 27 may be secured by an adhesive or in any other suitable manner. As shown in Fig. 7, there may also be utilized a fabric or other tape 28 disposed over the magnets 27 in order to assist in holding the same in place. In order to facilitate manipulation of the blank 25 in applying the same to a surface to be stenciled and removing the same therefrom, there may be provided a finger engaging tab 29 secured to the blank 25 in any suitable location and grasping the fingers will facilitate manipulating the blank 25 in any desired manner.

In the use of the form of the invention shown in Figs. 6 and 7, the background material or color will be sprayed onto the surface to be stenciled and after suitable drying, the blank 25 will be applied thereto and the magnets 27 will serve to hold the edges 26 in intimate engagement with such surface. Thereafter, a suitable coating composition will be sprayed on the entire surface and, of course, the blank 25 upon being removed from such surface, will leave an outline of the indicia provided thereby.

A still further modified form of the invention is shown in Figs. 8 and 9 in which the stencil may comprise a body 30 of molded material, such as rubber, plastic or the like and while this body 30 has been shown as having an edge outline for providing the desired indicia, obviously, the same principal may be applied by providing a molded body and also cutouts therein to provide the desired indicia. In the form shown for illustrative purposes in Figs. 8 and 9, the molded body 30 may also have molded therein a continuous magnet 31 of granular magnetic material and such magnet 31 extends all of the way around the body 30 adjacent the edges thereof and in order to enhance the intimate contact between the edges 32 of the body 30, there may be provided on the under surface thereof, a molded ridge 33 which is held in intimate contact with the surface to be stenciled by the magnet 31. In order to facilitate manipulation of the body 30, a finger engaging tab 34 may be integrally molded therewith at any suitable location, or the finger engaging tab 34 may be applied in any desired manner.

In Fig. 10 there is shown a further form of the invention in which a panel 35 of suitable flexible material, such as fiber board, stencil paper or the like, is provided with a plurality of cutouts 36 and 37 to provide the desired indicia or monogram and secured to the panel 35 adjacent the edges of the cutouts 36 and 37 are bar magnets 38 and 39 arranged in spaced end to end relationship. In order to reinforce the panel 35 and prevent inadvertent tearing or damage thereto, there may be provided a reinforcing frame 40 of any suitable material, such as wood and as shown in Fig. 10, the frame 40 is secured to the panel 35 adjacent the edges thereof in any desired manner. This form of the stencil is primarily intended to be utilized on flat surfaces where it is not necessary for the panel 35 to conform to curved or irregular surfaces.

In Fig. 11, there is shown a modified form of the invention shown in Fig. 10 and in which a panel 41 of flexible material may be provided with a cutout 42 providing the desired indicia and in order to maintain the edges 43 of the cutout 42 in intimate engagement with a surface to be stenciled, there may be secured to the outer surface of the panel 41 a plurality of bar magnets 44 arranged in spaced end to end relationship, as described above in connection with the other forms of the invention. For the purpose of reinforcing the panel 41 and preventing tearing or other damage thereto, but at the same time, retaining the flexibility thereof, in order that the same will conform to curved or irregular surfaces, there may be provided a reinforcing frame in the form of a plurality of lengths of wire or rods 45 arranged in spaced end to end relationship adjacent the edges 46 of the panel 41 and the rods or wires 45 may be secured in place by a fabric tape 47 applied thereover and adhesively secured to the panel 41. In this manner, the lengths of wire or rods 45 serve to adequately reinforce the edges of the panel 41, but at the same time, such panel is relatively flexible due to the spaced end to end relationship of the wires or rods 45.

One application of the stencil of this invention in which the surface to be stenciled is not on a magnet body or object is illustrated in Figs. 13 and 14 and in this case, a sheet of cardboard, paper or other non-magnetic material 48 may be placed on a table or other supporting member 49 of magnetic material and a stencil 50 constructed in accordance with any of the forms of the invention described above, may be placed on the upper surface of the paper or cardboard 48 and due to the attraction of the magnets to the magnetic table or body 49, the stencil 50 is securely held in place thereon and the coating composition may be applied through the stencil to the surface of the cardboard or paper 48 with substantially the same results as if the stencil were applied directly to a magnetic body.

In Figs. 15 and 16, there is illustrated a somewhat modified form of the invention described above in connection with Figs. 8 and 9, and in this form of the invention, there is provided a body 51 of molded rubber, plastic or other suitable material and having an edge outline providing the desired indicia and molded within the body 51 adjacent the edges thereof and arranged in end to end spaced relationship, are a plurality of bar magnets 52 which operate in the same manner as the continuous granular magnet, described above in connection with Figs. 8 and 9. Also, the body 51 may be provided, on its lower surface, with molded ridges 53 which serve to enhance the engagement between the body and the surface to be stenciled.

It will be seen that by the above described invention, there has been provided a relatively simple and economical stencil which may be conveniently utilized in connection with curved or flat surfaces, or with irregular surfaces of a magnetic body and which will result in providing a stencil having clear sharp outlines and in which fogging or penetration of the coating composition beneath the edges of the stencil is prevented. Furthermore, there has been provided a stencil in which unsupported or detached portions of the indicia may be adequately supported from the main body of the stencil and in which such supporting means is arranged in a manner to permit complete application of the coating composition to the entire outline thereby eliminating unbroken portions during the coating operation. Since, penetration of the coating composition beneath the edges of the stencil is substantially prevented, cleaning of the stencil is only necessary at very infrequent intervals and the same may be reused many times, since, due to the structure thereof, damage as the result of tearing or breakage is substantially eliminated.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A stencil comprising a panel of flexible material providing a mask, cutouts in said panel providing openings in the form of indicia and dividing said panel into a main masking portion and one or more detached masking sections, a plurality of bar magnets secured to the outer surface of said main masking portion in end to end relationship adjacent the edges of said cutouts, other bar magnets secured to the outer surface of said detached masking section adjacent the edges thereof and a plurality of generally U-shaped bridge members having their ends secured to the magnets on said main portion and to the magnets on said detached section to support said detached section from said main portion and with said bridge members spaced a substantial distance above the outer surface of said panel whereby said panel may be removably attached to the surface of a magnetic body by said magnets with the edges of said cutouts intimately engaging the surface of said body to permit a coating composition to be deposited on the surface of said body through said cutouts and beneath said bridge members.

2. A stencil as defined in claim 1, in which a fabric tape is applied to said panel between said magnets and said panel to reinforce said panel and prevent tearing of the edges of said cutouts.

3. A stencil comprising a panel of flexible material providing a mask, cutouts in said panel providing openings in the form of indicia and dividing said panel into a main masking portion and one or more detached masking sections, a plurality of bar magnets secured to the outer surface of said main masking portion adjacent the edges of said cutouts, other bar magnets secured to the outer surface of said detached masking section adjacent the edges thereof and a plurality of generally U-shaped bridge members having their ends secured to the magnets on said main portion and to the magnets on said detached section to support said detached section from said main portion and with said bridge members spaced a substantial distance above the outer surface of said panel whereby said panel may be removably attached to the surface of a magnetic body by said magnets with the edges of said cutouts intimately engaging the surface of said body to permit a coating composition to be deposited on the surface of said body through said cutouts and beneath said bridging members.

4. A stencil comprising a panel of flexible material providing a mask, cutouts in said panel providing openings in the form of indicia and dividing said panel into a main masking portion and one or more detached masking sections, a plurality of bar magnets secured to the outer surface of said main masking portion adjacent the edges of said cutouts, other bar magnets secured to the outer surface of said detached masking section adjacent the edges thereof and means secured to certain of the magnets on said main portion and to certain of the magnets on said detached section to support said detached section from said main portion and with said means spaced a substantial distance above the outer surface of said panel whereby said panel may be removably attached to the surface of the magnetic body by said magnets with the edges of said cutouts intimately engaging the surface of said body to permit a coating composition to be deposited on the surface of said body through said cutouts and beneath said means.

5. A stencil comprising a panel of flexible material providing a mask, cutouts in said panel providing openings in the form of indicia and dividing said panel into a main masking portion and one or more detached masking sections, a plurality of magnets secured to the outer surface of said main masking portion adjacent the edges of said cutouts, other magnets secured to the outer surface of said detached masking section adjacent the edges thereof and means secured to certain of the magnets on said main portion and to certain of the magnets on said detached section to support said detached section from said main portion and with said means spaced a substantial distance above the outer surface of said panel whereby said panel may be removably attached to the surface of a magnetic body by said magnets with the edges of said cutouts intimately engaging the surface of said body to permit a coating composition to be deposited on the surface of said body throught said cutouts and beneath said means.

References Cited in the file of this patent
UNITED STATES PATENTS

| | | |
|---|---|---|
| Re. 23,570 | Clark | Nov. 11, 1952 |
| 329,476 | Miller | Nov. 3, 1885 |
| 1,560,407 | Carufel | Nov. 3, 1925 |
| 1,561,534 | Gray | Nov. 17, 1925 |
| 1,624,538 | Crain | Apr. 12, 1927 |
| 1,707,729 | Kelly | Apr. 2, 1929 |
| 1,715,350 | Booth | June 4, 1929 |
| 1,735,883 | Smith | Nov. 19, 1929 |
| 1,809,199 | Gould | June 9, 1931 |
| 1,895,309 | Boomershine | Jan. 24, 1933 |
| 2,144,184 | Hale et al. | Jan. 17, 1939 |
| 2,237,734 | Grimsted | Apr. 8, 1941 |
| 2,254,498 | Scharf | Sept. 2, 1941 |
| 2,348,335 | Escher | May 9, 1944 |
| 2,363,842 | Duggan | Nov. 28, 1944 |
| 2,421,825 | Aulick | June 10, 1947 |
| 2,518,204 | Victor et al. | Aug. 8, 1950 |
| 2,651,989 | Kerr | Sept. 15, 1953 |

FOREIGN PATENTS

| | | |
|---|---|---|
| 217,435 | Great Britain | June 19, 1924 |
| 253,931 | Great Britain | Jan. 13, 1927 |